United States Patent
Kasai

(10) Patent No.: US 10,933,916 B2
(45) Date of Patent: Mar. 2, 2021

(54) VEHICLE FLOOR STRUCTURE

(71) Applicant: TOYOTA JIDOSHA KABUSHIKI KAISHA, Aichi-ken (JP)

(72) Inventor: Satoshi Kasai, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/257,320

(22) Filed: Jan. 25, 2019

(65) Prior Publication Data

US 2019/0233015 A1 Aug. 1, 2019

(30) Foreign Application Priority Data

Jan. 30, 2018 (JP) .............................. JP2018-013417

(51) Int. Cl.
*B62D 21/15* (2006.01)
*B62D 21/08* (2006.01)
*B62D 25/20* (2006.01)

(52) U.S. Cl.
CPC .......... *B62D 21/155* (2013.01); *B62D 21/08* (2013.01); *B62D 25/2018* (2013.01); *B62D 25/2027* (2013.01); *B62D 25/2036* (2013.01)

(58) Field of Classification Search
CPC .. B62D 21/155; B62D 21/08; B62D 25/2018; B62D 25/2027; B62D 25/2036
USPC .......................... 296/204, 193.07, 187.08, 30
See application file for complete search history.

(56) References Cited

U.S. PATENT DOCUMENTS

| | | | | |
|---|---|---|---|---|
| 10,124,834 B2 * | 11/2018 | Saeki | ................. | B62D 25/2036 |
| 2005/0189791 A1 * | 9/2005 | Chernoff | ................ | B62D 25/20 296/193.07 |
| 2009/0001766 A1 * | 1/2009 | Kurata | .................. | B62D 25/20 296/203.01 |
| 2012/0248822 A1 * | 10/2012 | Mildner | ................ | B62D 25/20 296/193.07 |
| 2016/0039467 A1 | 2/2016 | Takenaka | | |

FOREIGN PATENT DOCUMENTS

| | | |
|---|---|---|
| CN | 101332837 A | 12/2008 |
| CN | 104129439 A | 11/2014 |
| JP | 2016-37072 A | 3/2016 |

* cited by examiner

*Primary Examiner* — Jason S Morrow
*Assistant Examiner* — E Turner Hicks
(74) *Attorney, Agent, or Firm* — Hauptman Ham, LLP

(57) ABSTRACT

A vehicle floor structure includes a floor tunnel arranged in a center of a vehicle interior in a vehicle width direction from a front end of the vehicle interior to a rear side, the floor tunnel projecting upwardly from a floor surface of the vehicle interior, a tunnel reinforcement that is a reinforcing member covering the floor tunnel, the tunnel reinforcement projecting upwardly from the floor surface of the vehicle interior and extending in a vehicle length direction, and a first floor crossmember extending in the vehicle width direction on the floor surface of the vehicle interior. An opening is formed in each of a pair of side walls of the tunnel reinforcement, the side walls facing each other in the vehicle width direction and the first floor crossmember is arranged so as to go across an inside of the tunnel reinforcement through the openings.

13 Claims, 4 Drawing Sheets

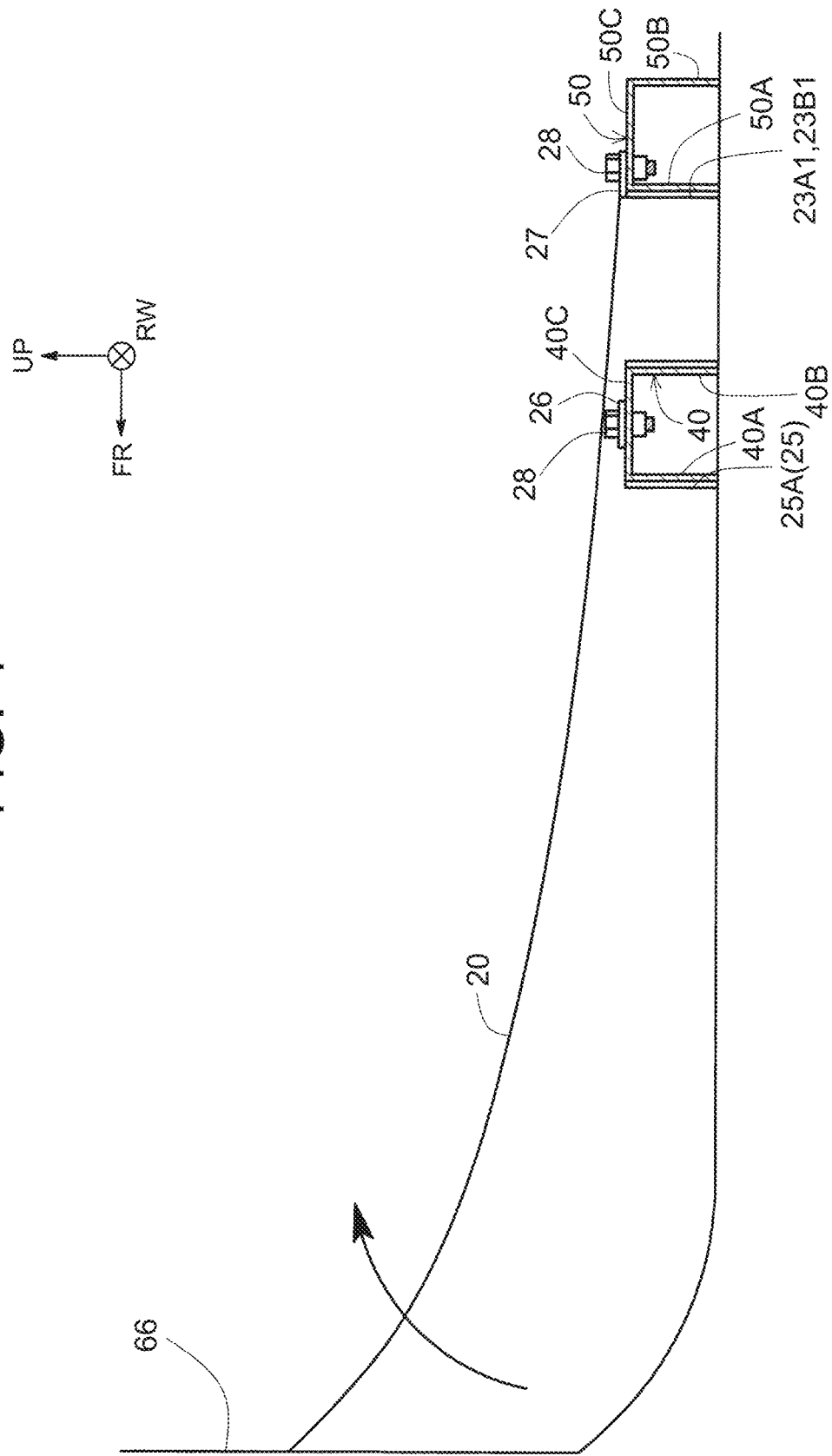

VEHICLE FLOOR STRUCTURE

INCORPORATION BY REFERENCE

The disclosure of Japanese Patent Application No. 2018-013417 filed on Jan. 30, 2018 including the specification, drawings and abstract is incorporated herein by reference in its entirety.

BACKGROUND

1. Technical Field

The disclosure relates to a vehicle floor structure.

2. Description of Related Art

In a center portion of a floor of a cabin (a vehicle interior) in a vehicle width direction, a floor tunnel is provided in a vehicle front-rear direction (a vehicle length direction). The floor tunnel projects upwardly from a surface of the floor.

For example, according to Japanese Unexamined Patent Application Publication No. 2016-037072 (JP 2016-037072 JP), tunnel reinforcements are provided on both side ends of a floor tunnel in the vehicle width direction, respectively. The tunnel reinforcements are reinforcing members extending in the vehicle length direction. By providing the tunnel reinforcements, buckling deformation of the floor tunnel is restrained when frontal collision happens.

SUMMARY

By providing the tunnel reinforcements extending in the vehicle length direction, buckling deformation of the floor tunnel is restrained at the time of frontal collision. However, a vehicle interior space can be reduced as the tunnel reinforcements themselves are moved rearward. Therefore, the disclosure provides a vehicle floor structure that is able to restrain a tunnel reinforcement from moving rearward at the time of frontal collision.

A vehicle floor structure according to an aspect of the disclosure includes a floor tunnel, a tunnel reinforcement, and a first floor crossmember. The floor tunnel is arranged in a center of a vehicle interior in a vehicle width direction from a front end of the vehicle interior to a rear side, and projects upwardly from a floor surface of the vehicle interior. The tunnel reinforcement is a reinforcing member covering the floor tunnel, and projects upwardly from the floor surface of the vehicle interior and extends in a vehicle length direction. The first floor crossmember extends in the vehicle width direction on the floor surface of the vehicle interior. An opening is formed in each of a pair of side walls of the tunnel reinforcement. The side walls face each other in the vehicle width direction, and the openings pass through the side walls in the vehicle width direction. The first floor crossmember is arranged so as to go across an inside of the tunnel reinforcement through the openings.

With the foregoing aspect, by allowing the first floor crossmember to go across the tunnel reinforcement, the first floor crossmember comes into contact with the tunnel reinforcement when the tunnel reinforcement moves rearward at the time of frontal collision. Thus, the tunnel reinforcement is restrained from moving rearward.

Also, in the foregoing aspect, a second floor crossmember may be provided. The second floor crossmember may be provided on the rear side with respect to the first floor crossmember and extend on the floor surface of the vehicle interior in the vehicle width direction. In this case, the second floor crossmember may be arranged on the rear side with respect to a rear end of the tunnel reinforcement.

With the foregoing aspect, when the tunnel reinforcement moves rearward at the time of frontal collision, not only the first floor crossmember but also the second floor crossmember comes into contact with tunnel reinforcement. Thus, the tunnel reinforcement is restrained from moving rearward.

In the foregoing aspect, a rear end flange may be formed in the rear end of the tunnel reinforcement. The rear end flange may extend from the rear end to the rear side and is fastened to the second floor crossmember. Also, in this case, a side flange may be formed in a periphery of each of the openings of the tunnel reinforcement. The side flange may be fastened to the first floor crossmember that passes through the openings.

At the time of frontal collision, there is a case where a load is applied so that a front end of the tunnel reinforcement is lifted around a rear portion of the tunnel reinforcement that serves as a center of rotation, based on a direction of the load applied at the time of the frontal collision and a shape of the front end of the tunnel reinforcement. With the foregoing aspect, the tunnel reinforcement is fastened to the floor crossmembers (the first floor crossmember and the second floor crossmember) at two places along the vehicle length direction. Therefore, such lifting rotation is restrained.

Further, in the foregoing aspect, the side flange of the tunnel reinforcement may be fastened to the first floor crossmember by a bolt, and the rear end flange of the tunnel reinforcement may be fastened to the second floor crossmember by a bolt.

With the aspect, when the tunnel reinforcement moves rearward at the time of frontal collision, the tunnel reinforcement is stopped by the bolts. Thus, the tunnel reinforcement is restrained from moving rearward.

With the aspect, it is possible to restrain the tunnel reinforcement from moving rearward at the time of frontal collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a view describing a load applied to the tunnel reinforcement at the time of frontal collision (2 of 2).

DETAILED DESCRIPTION OF EMBODIMENTS

With reference to FIG. 1 to FIG. 4, a vehicle floor structure according to the embodiment is described. In FIG. 1 to FIG. 4, a vehicle front-rear direction (hereinafter, also referred to as a vehicle length direction as necessary) is shown as an axis represented by a symbol FR, a vehicle width direction is shown as an axis represented by a symbol RW, and a vertical direction (hereinafter, also referred to as a vehicle height direction as necessary) is shown as an axis represented by a symbol UP. The symbol FR is an abbreviation of "front", and a front side of a vehicle is a forward direction of the axis FR in the vehicle length direction. The symbol RW is an abbreviation of a "right width", and a right width direction is a forward direction of the axis RW in the vehicle width direction. An upper direction is a forward direction of the axis UP in the vehicle height direction.

Figure 1:
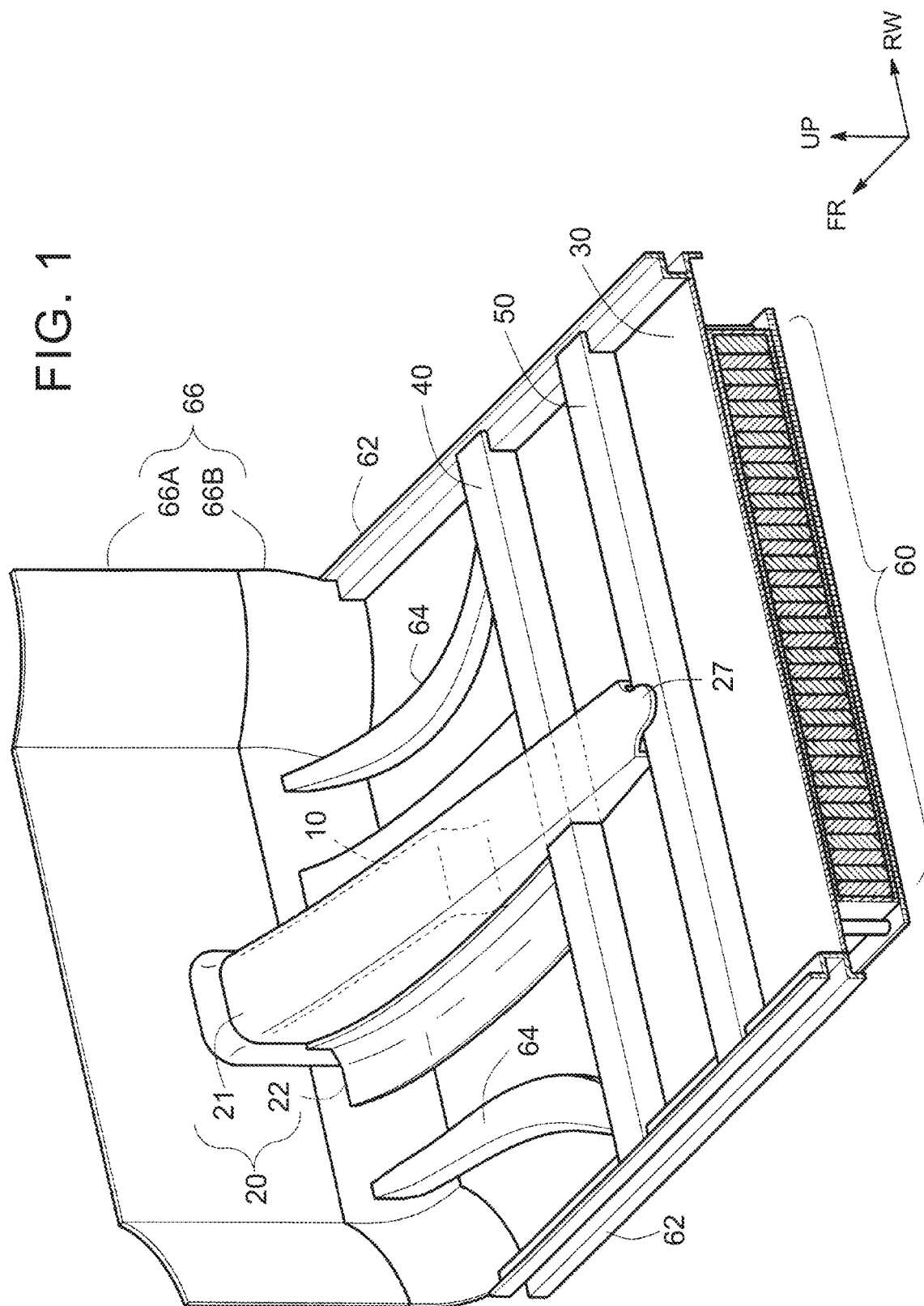
FIG. 1 is a perspective view of an example of a vehicle floor structure according to an embodiment.

FIG. 1 shows an example of the vehicle floor structure according to the embodiment. The floor structure includes a floor tunnel 10, a tunnel reinforcement 20, a floor panel 30, a first floor crossmember 40, and a second floor crossmember 50. The floor structure is mounted on, for example, an electric vehicle.

The floor panel 30 is a plate member that structures a floor surface of a vehicle interior (a cabin). In the example shown in FIG. 1, a battery pack 60 is provided under the floor panel 30. The battery pack 60 supplies electric power to a rotary electric machine (not shown) that is a driving source of the electric vehicle.

The battery pack 60 houses a plurality of battery modules. For example, a plurality of cell groups is provided, and, in each of the cell groups, a plurality of battery cells (single cells) is connected with each other in parallel. Then, these cell groups are connected with each other in series, and serve as the battery module. The battery cell is made of, for example, a nickel-hydrogen secondary battery, a lithium-ion secondary battery, and a solid-state battery.

A pair of rockers 62 is provided so that the rockers 62 are located in both side ends of the floor panel 30 in the vehicle width direction, respectively. The rockers 62 are skeleton members extending in the vehicle length direction. Also, the floor tunnel 10 is provided in a center of the floor panel 30 in the vehicle width direction. Further, a front side member 64 serving as a skeleton member is provided between the floor tunnel 10 and each of the rockers 62. The configuration of the floor tunnel 10 is described later.

A dash panel 66 is provided in a front end of the floor panel 30. The dash panel 66 is a partition wall that separates the vehicle interior from an engine compartment (a motor compartment) located in front of the vehicle interior. The dash panel 66 includes an upper dash panel 66A and a lower dash panel 66B. The upper dash panel 66A is an upper member of the dash panel 66 and extends almost perpendicularly. An upper end of the lower dash panel 66B is connected with a lower end of the upper dash panel 66A. The lower dash panel 66B is bent rearward from its upper end, and a rear end of the lower dash panel 66B becomes almost horizontal and is connected with the front end of the floor panel 30.

Further, the first floor crossmember 40 and the second floor crossmember 50 are provided on the floor panel 30 (on a floor surface of the vehicle interior). The first floor crossmember 40 and the second floor crossmember 50 are skeleton members extending in the vehicle width direction, and their both ends in the vehicle width direction are connected with the rockers 62. The connection is done by, for example, welding or bolting. The first floor crossmember 40 and the second floor crossmember 50 are provided, for example, below front seats (a drivers seat and a front passenger seat) in the vehicle interior.

The first floor crossmember 40 and the second floor crossmember 50 have, for example, a hat shape in a side view (a view in the RW direction), and are arranged on the floor panel 30 so that their open ends face down on the floor panel 30. Thus, closed section configurations are formed. For example, the first floor crossmember 40 and the second floor crossmember 50 extend linearly along the vehicle width direction.

Figure 3:
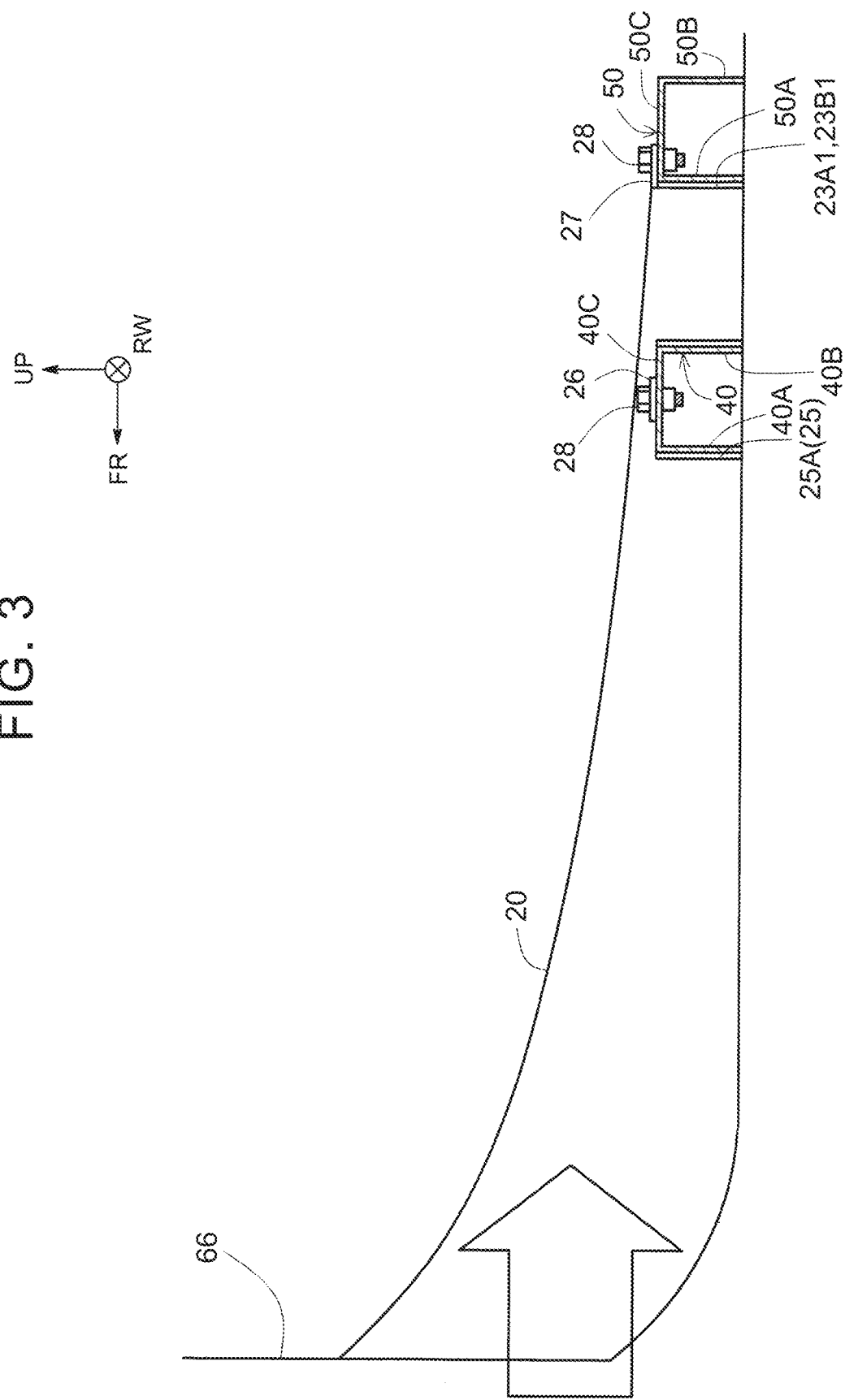
FIG. 3 is a view describing a load applied to the tunnel reinforcement at the time of frontal collision (1 of 2)

With reference to FIG. 3, the first floor crossmember 40 includes a front wall 40A, a rear wall 40B, and an upper wall 40C. The front wall 40A is erected perpendicularly to a horizontal surface (an FR-RW plane) and extends in the vehicle width direction. The rear wall 40B is provided on the rear side with respect to the front wall 40A. The upper wall 40C connects upper ends of the front wall 40A and the rear wall 40B with each other, and is provided in parallel to the horizontal surface (the FR-RW plane).

Figure 2:
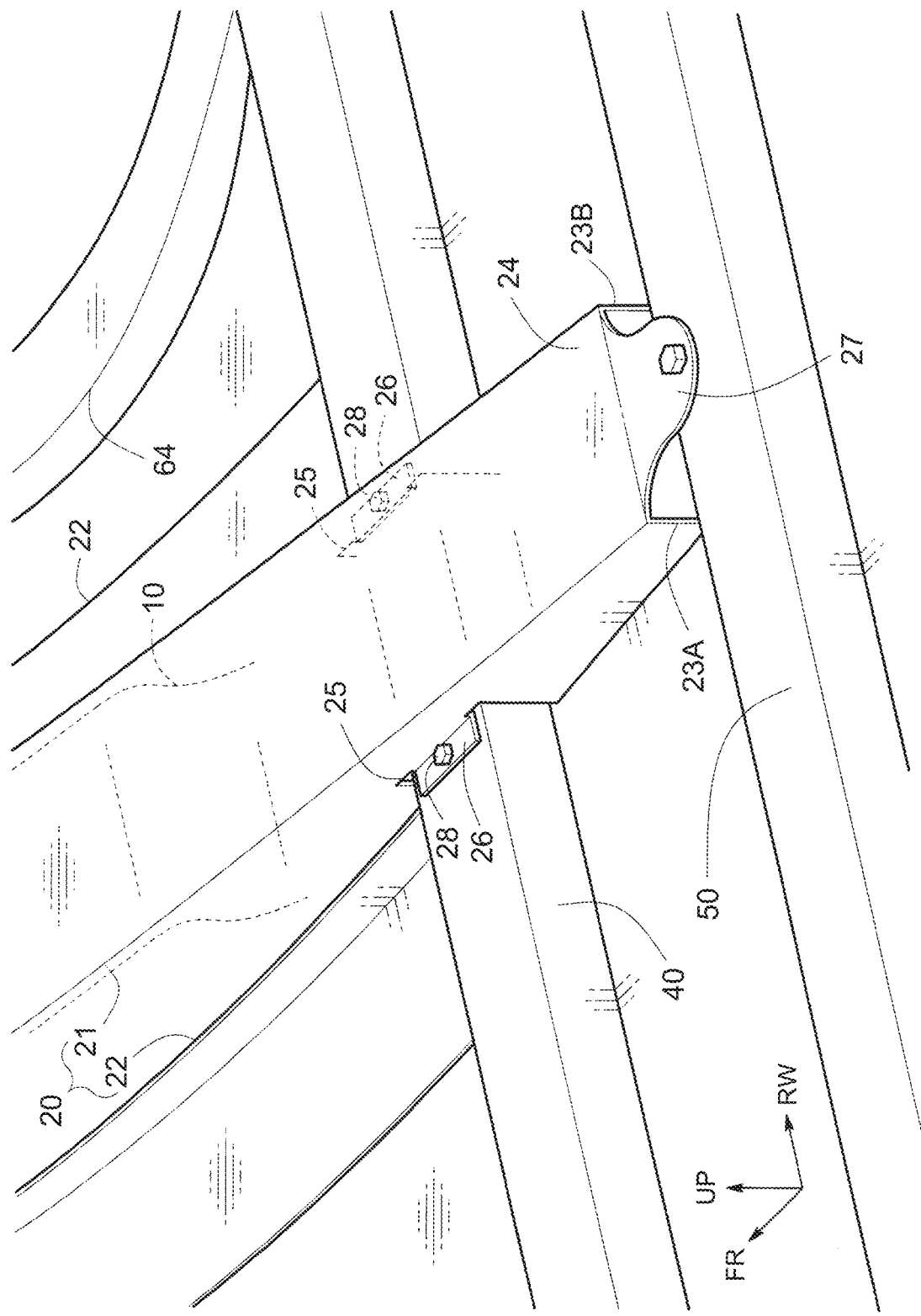
FIG. 2 is an enlarged perspective view of a periphery of a rear end of a tunnel reinforcement.

Also, as shown in FIG. 1 and FIG. 2 as an example, the first floor crossmember 40 passes through the tunnel reinforcement 20. This means that, as described later, the first floor crossmember 40 is arranged so as to go across an inside of the tunnel reinforcement 20 (while passing) through openings 25 of the tunnel reinforcement 20.

As described above, the first floor crossmember 40 according to the embodiment passes through the tunnel reinforcement 20, and stretches between the rockers 62 located at both ends of the first floor crossmember 40 in the vehicle width direction. Thus, for example, rigidity of the first floor crossmember 40 against a load applied from a vehicle interior side is improved compared to a case where the first floor crossmember 40 is disconnected and does not pass through the tunnel reinforcement 20 and the floor tunnel 10

The second floor crossmember 50 is provided on the rear side with respect to the first floor crossmember 40. Further, the second floor crossmember 50 is provided on the rear side with respect to a rear end of the tunnel reinforcement 20.

With reference to FIG. 3, the second floor crossmember 50 includes a front wall 50A, a rear wall 50B, and an upper wall 50C. The front wall 50A is erected perpendicularly to the horizontal surface (the FR-RW plane) and extends in the vehicle width direction. The rear wall 50B is provided on the rear side with respect to the front wall 50A. The upper wall 50C connects upper ends of the front wall 50A and the rear wall 50B with each other, and is provided in parallel to the horizontal surface (the FR-RW plane).

As shown in FIG. 1, when it is considered that the tunnel reinforcement 20 is arranged vertically, and that the first floor crossmember 40 and the second floor crossmember 50 are arranged laterally, then the tunnel reinforcement 20, the first floor crossmember 40, and the second floor crossmember 50 are arranged in a shape of the plus-minus sign (±). With such a configuration, when a load is applied that tries to squeeze the tunnel reinforcement 20 to the rear side at the time of frontal collision of a vehicle, the first floor crossmember 40 and the second floor crossmember 50 come into contact with the tunnel reinforcement 20. This makes it possible to restrain the tunnel reinforcement 20 (and the floor tunnel 10) from moving rearward. In other words, at the time of frontal collision, the first floor crossmember 40 and the second floor crossmember 50 serve as stoppers and restrain the tunnel reinforcement 20 (and the floor tunnel 10) from moving rearward.

With reference to FIG. 1, the floor tunnel 10 is arranged in the center in the vehicle width direction from a front end of the vehicle interior to the rear side. The floor tunnel 10 projects upwardly from the floor surface of the vehicle interior, the floor surface being an upper surface of the floor panel. For example, the floor tunnel 10 has a hat shape in a front view (a view in the FR direction), and includes a pair of side walls and an upper wall. The side walls face each other in the vehicle width direction, and the upper wall connects upper ends of the side walls with each other.

A front end of the floor tunnel 10 is connected with the dash panel 66. Also, as shown by broken lines in FIG. 1, a height (a tunnel height) of the upper wall that is a roof of the floor tunnel 10 (a tunnel root) from the floor surface (an upper surface of the floor panel) is gradually lowered to the rear, and a rear end of the floor tunnel 10 is connected with the floor panel 30.

When an internal combustion engine is installed as a driving source of the vehicle, an exhaust pipe passes inside the floor tunnel 10. However, in the case shown in FIG. 1 as an example where an internal combustion engine is not installed and the battery pack 60 is housed under the floor, peripheral equipment of the battery pack 60 is housed inside the floor tunnel 10. An example of the peripheral equipment of the battery pack 60 is a battery control unit (not shown) that manages and monitors electric power of the battery pack 60.

Also, in an electric vehicle, it is not necessary to extend the floor tunnel 10 to the rear of the vehicle, unlike the case where the exhaust pipe passes inside the floor tunnel 10. Therefore, as shown in FIG. 1 as an example, it is possible to decide a length of the floor tunnel 10 in the vehicle length direction so that the rear end of the floor tunnel 10 is positioned in front of the first floor crossmember 40.

The tunnel reinforcement 20 is a reinforcing member that covers the floor tunnel 10, and is formed so as to have higher rigidity than that of the floor tunnel 10. Similarly to the floor tunnel 10, the tunnel reinforcement 20 projects upwardly from the upper surface of the floor panel 30 (the floor surface of the vehicle interior) and extends in the vehicle length direction. As the floor tunnel 10 is covered by the tunnel reinforcement 20 in the vehicle length direction, buckling deformation (compressive deformation) of the floor tunnel 10 in the vehicle length direction is restrained at the time of frontal collision. In FIG. 1, a portion of the floor tunnel 10 covered by the tunnel reinforcement 20 is shown by the broken line.

The tunnel reinforcement 20 includes an upper tunnel reinforcement 21 serving as an upper member, and lower tunnel reinforcements 22 serving as lower members. Each of the lower tunnel reinforcements 22 is joined to a lower portion (for example, a lower half) of the side wall of the floor tunnel 10, folded back so as to spread in the vehicle width direction, and extends to the floor panel 30. With regard to a length of the lower tunnel reinforcement 22 in the vehicle length direction, the lower tunnel reinforcement 22 extends, for example, to the front wall 40A of the first floor crossmember 40 (see FIG. 3).

As shown in FIG. 2 as an example, the upper tunnel reinforcement 21 includes an upper wall 24 and side walls 23A, 23B that cover the floor tunnel 10. The side walls 23A, 23B are erected perpendicularly to the horizontal surface and extend in the vehicle length direction. The upper wall 24 connects upper ends of the side walls 23A, 23B with each other.

The upper tunnel reinforcement 21 may extend further to the rear side beyond the rear end of the floor tunnel 10. For example, in order for the upper tunnel reinforcement 21 to be supported by the first floor crossmember 40 and the second floor crossmember 50, the upper tunnel reinforcement 21 may stride over across the first floor crossmember 40 and a rear end of the upper tunnel reinforcement 21 is positioned in front of the second floor crossmember 50.

A region from the rear end of the floor tunnel 10 through the rear end of the upper tunnel reinforcement 21 has a configuration of a closed section. The closed section is a section of an UP axis-RW axis plane (a section in the front view) surrounded by the upper wall 24 and the side walls 23A, 23B of the upper tunnel reinforcement 21, and the floor panel 30. Space defined by the closed-section configuration may be a so-called "dead space" where no equipment is housed, and has a configuration in which the first floor crossmember 40 goes across the inside of the dead space.

The opening 25 is formed in each of the side walls 23A, 23B of the upper tunnel reinforcement 21. The side walls 23A, 23B face each other in the vehicle width direction, and the openings 25 pass through the side walls 23A, 23B in the vehicle width direction at intersection points between the side walls 23A, 23B and the first floor crossmember 40, respectively. The opening 25 may have a shape along a sectional shape of the first floor crossmember 40 in a side view (a section along an UP axis-FR axis plane). For example, the openings 25 may be a rectangular opening with a given clearance from the section of the first floor crossmember 40 in the side view.

Further, in the upper tunnel reinforcement 21, a side flange 26 is provided. The side flange 26 is fastened with the first floor crossmember 40. The side flange 26 is provided in the periphery of each of the openings 25 into which the first floor crossmember 40 is inserted. For example, the side flange 26 extends from an upper side of the rectangular opening 25 to an outer side in the vehicle width direction, and the side flange 26 is fastened to the upper wall 40C of the first floor crossmember 40 by a bolt 28.

The rear end of the upper tunnel reinforcement 21 is disposed in front of the second floor crossmember 50. For example, rear ends 23A1, 23B1 of the side walls 23A, 23B of the upper tunnel reinforcement 21 come into contact with the front wall 50A of the second floor crossmember 50 (see FIG. 3). Alternatively, a clearance along the vehicle length direction may be provided between the front wall 50A of the second floor crossmember 50 and the rear ends 23A1, 23B1 of the side walls 23A, 23B of the upper tunnel reinforcement 21.

From a rear end of the upper wall 24 of the upper tunnel reinforcement 21, a rear end flange 27 extends further to the rear side. The rear end flange 27 partially overlaps the upper wall 50C of the second floor crossmember 50, and the partially-overlapped portion is fastened by a bolt 28.

Behavior at the Time of Frontal Collision

With reference to FIG. 3 and FIG. 4, a behavior of the vehicle floor structure according to the embodiment at the time of frontal collision is described. When a vehicle front surface collides with an obstacle (a barrier), the obstacle enters the vehicle. Thus, equipment such as the rotary electric machine housed the engine compartment (the motor compartment) at the front of the vehicle is moved rearward. Such equipment collides with the dash panel 66, the floor tunnel 10, and also the tunnel reinforcement 20 behind such equipment.

At this point, as shown in FIG. 3 as an example, a load is applied that pushes the tunnel reinforcement 20 to the rear side. Then, the bolts 28 that pass through the side flanges 26 of the tunnel reinforcement 20 and the upper wall 40C of the first floor crossmember 40 serve as stoppers and restrain the tunnel reinforcement 20 from moving rearward. Similarly, the bolts 28 that pass through the rear end flange 27 of the tunnel reinforcement 20 and the upper wall 50C of the second floor crossmember 50 serve as stoppers and restrain the tunnel reinforcement 20 from moving rearward.

Further, even when shafts of the bolts 28 are deformed, or even if the shafts are broken, the first floor crossmember 40 arranged so as to go across the tunnel reinforcement 20, and the second floor crossmember 50 arranged on the rear side of the rear end of the tunnel reinforcement 20 come into contact with the tunnel reinforcement 20 (and serve as stoppers), thereby restraining the tunnel reinforcement 20 from moving rearward.

Specifically, the front wall 40A of the first floor crossmember 40 comes into contact with a front edge 25A of the opening 25 of the tunnel reinforcement 20 (and serves as a stopper), thereby restraining the tunnel reinforcement 20 from moving rearward. Similarly, the front wall 50A of the second floor crossmember 50 comes into contact with the side wall rear ends 23A1, 23B1 of the tunnel reinforcement 20 (and serves as a stopper), restraining the tunnel reinforcement 20 from moving rearward.

Also, the tunnel reinforcement 20 is configured so that its front end is raised with respect to its rear end. Therefore, as shown in FIG. 4 as an example, at the time of frontal collision, a load is applied so that the front end of the tunnel reinforcement 20 (and the floor tunnel 10) is lifted (struck upward) around the rear end flange 27 of the tunnel reinforcement 20 that serves as the center of rotation.

Since the side flanges 26 of the tunnel reinforcement 20 are fastened (bolted) to the first floor crossmember 40 in front of the rear end flange 27 that serves as the center of rotation, such lifting rotation is restrained against the application of the load.

What is claimed is:

1. A vehicle floor structure comprising:
   a floor tunnel that is arranged in a center of a vehicle interior in a vehicle width direction from a front end of the vehicle interior to a rear side, the floor tunnel projecting upwardly from a floor surface of the vehicle interior;
   a tunnel reinforcement that is a reinforcing member covering the floor tunnel, the tunnel reinforcement projecting upwardly from the floor surface of the vehicle interior and extending in a vehicle length direction; and
   a first floor crossmember extending in the vehicle width direction on the floor surface of the vehicle interior, wherein:
   an opening is formed in each of a pair of side walls of the tunnel reinforcement, the side walls facing each other in the vehicle width direction, and the openings passing through the side walls in the vehicle width direction; and
   the first floor crossmember is arranged so as to go across an inside of the tunnel reinforcement through the openings.

2. The vehicle floor structure according to claim 1, further comprising
   a second floor crossmember that is provided on a rear side with respect to the first floor crossmember, and extends on the floor surface of the vehicle interior in the vehicle width direction, wherein
   the second floor crossmember is arranged on the rear side with respect to a rear end of the tunnel reinforcement.

3. The vehicle floor structure according to claim 2, wherein:
   a rear end flange is formed in the rear end of the tunnel reinforcement, the rear end flange extending from the rear end to the rear side and being fastened to the second floor crossmember; and
   a side flange is formed in a periphery of each of the openings of the tunnel reinforcement, the side flange being fastened to the first floor crossmember that passes through the openings.

4. The vehicle floor structure according to claim 3, wherein:
   the side flange of the tunnel reinforcement is fastened to the first floor crossmember by a bolt; and
   the rear end flange of the tunnel reinforcement is fastened to the second floor crossmember by a bolt.

5. The vehicle floor structure according to claim 1, wherein:
   the first floor crossmember projects upwardly from the floor surface of the vehicle interior.

6. The vehicle floor structure according to claim 2, wherein:
   the first floor crossmember and the second floor crossmember project upwardly from the floor surface of the vehicle interior.

7. The vehicle floor structure according to claim 6, wherein:
   the tunnel reinforcement has a higher rigidity than the floor tunnel.

8. The vehicle floor structure according to claim 1, wherein:
   the tunnel reinforcement has a higher rigidity than the floor tunnel.

9. The vehicle floor structure according to claim 1, wherein:
   each opening of the openings formed in the side walls of the tunnel reinforcement comprises
      a front edge extending upwardly from a floor panel which defines the floor surface of the vehicle interior, and
      a rear edge extending upwardly from the floor panel, and arranged rearward from the front edge in the vehicle length direction, and
   the first floor crossmember extends upwardly from the floor panel, and is arranged, in the vehicle length direction, between the front edge and the rear edge of each opening of the openings.

10. The vehicle floor structure according to claim 9, wherein:
    the first floor crossmember comprises a front wall configured to, upon a frontal collision, come into contact with the front edge of each opening of the openings to restrain the tunnel reinforcement from moving rearward in the vehicle length direction.

11. The vehicle floor structure according to claim 10, wherein:
    each opening of the openings further comprises a top edge connecting the front edge and the rear edge of said each opening, and
    the tunnel reinforcement further comprises a side flange extending in the vehicle width direction from the top edge of each opening of the openings, the side flange being fastened to an upper wall of the first floor crossmember that passes through said each opening underneath the top edge of said each opening.

12. The vehicle floor structure according to claim 11, further comprising:
    a second floor crossmember arranged rearward from the first floor crossmember in the vehicle length direction, the second floor crossmember extending upwardly from the floor panel and also extending in the vehicle width direction, wherein
    the second floor crossmember is arranged rearward from a rear end of the tunnel reinforcement in the vehicle length direction, and
    the second floor crossmember has a front wall configured to, upon the frontal collision, come into contact with the rear end of the tunnel reinforcement to restrain the tunnel reinforcement from moving rearward in the vehicle length direction.

13. The vehicle floor structure according to claim 12, wherein:

the tunnel reinforcement further comprises an upper wall connecting the side walls of the tunnel reinforcement, and the upper wall of the tunnel reinforcement comprises a rear end flange extending further rearward in the vehicle length direction beyond the front wall of the second floor crossmember, and being fastened to an upper wall of the second floor crossmember.

\* \* \* \* \*